United States Patent
Okoroafor et al.

[11] Patent Number: 6,121,336
[45] Date of Patent: Sep. 19, 2000

[54] SURFACTANTS FOR INCORPORATING SILICA AEROGEL IN POLYURETHANE FOAMS

[75] Inventors: Michael O. Okoroafor, Export, Pa.; Alan E. Wang, Hoffman Estates, Ill.; Bulent E. Yoldas, Pittsburgh, Pa.

[73] Assignee: BASF Corporation, Mount Olive, N.J.

[ * ] Notice: This patent is subject to a terminal disclaimer.

[21] Appl. No.: 08/267,723

[22] Filed: Jun. 28, 1994

[51] Int. Cl.$^7$ ........................................... C08J 9/00
[52] U.S. Cl. .................. 521/112; 521/99; 528/48; 528/55; 528/76; 524/588; 524/589; 524/860; 524/863; 556/450; 556/466
[58] Field of Search ............ 521/112, 99; 528/48, 528/55, 76; 524/588, 589, 860, 863; 556/450, 466

[56] References Cited

U.S. PATENT DOCUMENTS

| | | | |
|---|---|---|---|
| 3,594,334 | 7/1971 | Marlin | 260/2.5 |
| 3,640,920 | 2/1972 | Cear | 260/2.5 AK |
| 3,790,612 | 2/1974 | Raleigh | 260/448.2 B |
| 3,867,420 | 2/1975 | Morehouse et al. | 528/15 |
| 3,933,695 | 1/1976 | Omietanski et al. | 260/2.5 AH |
| 4,081,410 | 3/1978 | Moeller | 260/2.5 AH |
| 4,108,791 | 8/1978 | Wasilczyk | 252/182 |
| 4,217,422 | 8/1980 | Wasilczyk | 521/122 |
| 4,256,846 | 3/1981 | Ohashi et al. | 521/117 |
| 4,278,770 | 7/1981 | Chandalia et al. | 521/99 |
| 4,312,963 | 1/1982 | Chandalia et al. | 525/56 |
| 4,327,194 | 4/1982 | Chandalia et al. | 521/99 |
| 4,529,743 | 7/1985 | Kollmeier et al. | 521/112 |
| 4,555,448 | 11/1985 | Durham | 428/402 |
| 4,751,251 | 6/1988 | Thornsberry | 521/112 |
| 4,795,763 | 1/1989 | Gluck et al. | 521/99 |
| 5,010,112 | 4/1991 | Glicksman et al. | 521/76 |
| 5,034,424 | 7/1991 | Wenning et al. | 521/109.1 |
| 5,071,881 | 12/1991 | Parfondry et al. | 521/51 |
| 5,075,343 | 12/1991 | Blount | 521/85 |
| 5,124,364 | 6/1992 | Wolff et al. | 521/55 |
| 5,137,927 | 8/1992 | Wolff et al. | 521/54 |
| 5,169,872 | 12/1992 | Petroff et al. | 521/112 |
| 5,254,601 | 10/1993 | Doerge | 521/131 |
| 5,272,183 | 12/1993 | Doerge | 521/131 |
| 5,308,881 | 5/1994 | Londrigan et al. | 521/112 |

FOREIGN PATENT DOCUMENTS

0533202A1 3/1993 European Pat. Off. .

OTHER PUBLICATIONS

"Correlation Between Surfactant Performance and Raw Materials in the Formation of Rigid Polyurethane Foams", by H. J. Kollmeier et al., Journal of Cellular Plastics, pp. 255–258, Jul./Aug. 1983.

*Primary Examiner*—Duc Truong

[57] ABSTRACT

Polyurethane foams prepared using polysiloxane/polyoxyalkylene surfactants, preferably blended with a viscosity modifying agent, particularly in combination with particulate silica, especially silica aerogel, exhibit improved thermal insulating capacity, as measured by K-factor, and improved closed cell content, without increasing the density of the polyurethane foam.

7 Claims, 3 Drawing Sheets

SURFACTANTS FOR INCORPORATING SILICA AEROGEL IN POLYURETHANE FOAMS

BACKGROUND OF THE INVENTION

The present invention relates generally to the art of surfactants, and more particularly to the art of surfactants in polyurethane foams.

U.S. Pat. No. 5,308,881 to Londrigan et al. discloses a closed cell, rigid polyisocyanurate foam which comprises the reaction product of a polyisocyanate and a polyol in the presence of a hydrogen-containing blowing agent, and a siloxane oxyalkylene copolymer having a molecular weight below 7500 and an oxyalkylene portion containing greater than 60 weight percent of oxyethylene units. The siloxane oxyalkylene copolymer is prepared by the reaction of an organohydrogen siloxane with a polyoxyalkylene in an essentially solventless system or in the presence of a high boiling point polar polyol.

Insulating foams such as polyurethanes and polyisocyanurates have historically used chlorofluorocarbons (CFCs) as blowing agents, i.e. gases generating bubbles to create cell structures in the polymer network to form a foam. With increasing concerns about the environmental effects of CFC use, which have been linked to ozone depletion and global warming, and impending bans on many uses, foam producers must find alternate blowing agents. Unfortunately, the current non-CFC candidates, hydrochlorofluorocarbons (HCFCs) and hydrofluorocarbons (HFCs), have higher thermal conductivities and so are less effective than CFCs, resulting in less insulating capacity for foams produced using them as blowing agents. Thus as CFC use in foams is phased out in accordance with Environmental Protection Agency (EPA) regulations, foam producers must find ways to improve the insulating values of foams produced with less thermally effective alternate blowing agents because demand for energy efficiency is concurrently increasing, whether it relates to energy consumption of refrigerators or home heating and cooling.

The thermal conductivity (K-factor) of a porous material, such as polyurethane foam, is the sum of the conductivity through the solid phase, the conductivity through the gas phase, conductivity attributed to radiational transfer, and conductivity attributed to convection, which is generally less significant. For polyurethane foams, $K_f = K_s + K_g + K_r$, i.e. the thermal conductivity of the foam ($K_f$) is equal to the thermal conductivity through the solid polymer phase ($K_s$), plus the thermal conductivity through the gas in the foam cells ($K_g$) and the thermal conductivity through radiative heat transfer ($K_r$), which may be as high as 30 percent of total thermal conductivity.

SUMMARY OF THE INVENTION

The present invention provides polyurethane foams with lower thermal conductivity, K-factor, i.e. improved thermal insulating capacity, using polysiloxane-polyoxyalkylene copolymer surfactants, particularly blends of such surfactants with a viscosity modifying agent, and preferably in combination with silica particles, particularly silica aerogel particles. The K-factor improvement over polyurethane foam produced without additives of the present invention is maintained upon aging of the polyurethane foam.

DESCRIPTION OF THE PREFERRED EMBODIMENTS

Figure 1:
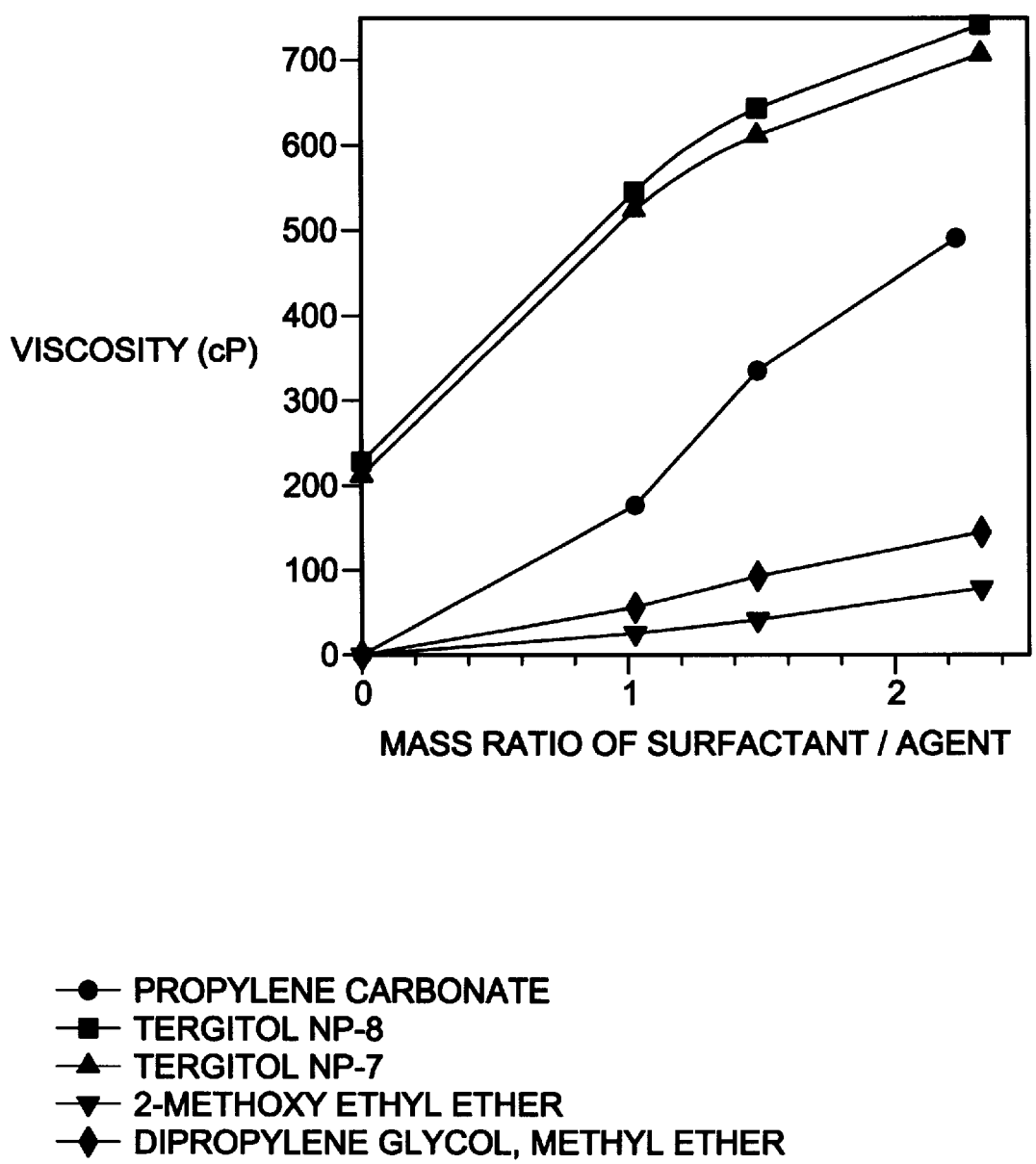
FIG. 1 shows the viscosity in centipoises of surfactant of the present invention blended with preferred viscosity modifying agents propylene carbonate; 2-methoxy ethyl ether; dipropylene glycol, methyl ether; and two commercial polyethers, Tergitol® NP-7 and NP-8, at surfactant/agent ratios up to 2.4 by weight.

Since the thermal conductivity through the gas phase ($K_g$) is increased with non-CFC blowing agents, the present invention emphasizes lowering the thermal conductivity through the solid phase ($K_s$) in two ways. By introducing silica particles into the polymer network structure, the thermal conductivity is reduced because the solid phase now contains a lower thermal conductivity component, i.e., silica. With silica aerogel, the solid phase also contains an additional gas component, i.e. the gas within the aerogel, to lower thermal conductivity. By incorporating the surfactants of the present invention, particularly in combination with silica particles, particularly silica aerogel, into the polyurethane foam thermal conductivity is further reduced because the polyurethane network structure is believed to have thinner cell walls.

The surfactants of the present invention also promote uniform distribution of the silica in the polyurethane network structure. The use of a viscosity modifying agent in combination with surfactant in accordance with the present invention further improves thermal performance of the polyurethane foam, especially in combination with silica particles, particularly silica aerogel.

The present invention further addresses lowering the thermal conductivity of the foam by decreasing radiative heat transfer. Silica, particularly aerogels, can be reduced in particle size to an average particle size which is within the scattering range of infrared radiation, thus making the foam more opaque to infrared radiation, thereby decreasing radiative heat transfer. A preferred particle size range, especially for silica aerogels, is from about 1 to 5 microns.

To form a silica gel, alkoxysilanes may be hydrolyzed, condensed and polymerized in a liquid medium to form a three-dimensional network of polymeric silica comprising residual fluid in the interstitial spaces, generally from the liquid reaction medium and/or by-product water and alcohol from the condensation polymerization reaction. The silica gel may be a hydrogel or alcogel depending on the liquid in the interstitial spaces being predominantly water or alcohol respectively. If the liquid is removed from the interstitial spaces, resulting in a collapsed structure, which is described as a xerogel, the porosity of the gel is significantly diminished as a result of surface tension forces as liquid is removed.

To prevent drastic reduction in pore volume, as much as 90 to 95 percent, silica gel may be treated to introduce gas as liquid is removed from the interstitial spaces to prevent compression or collapse of the network structure by maintaining fluid volume in the interstitial spaces. The high porosity silica gel wherein the interstitial spaces contain gas is described as an aerogel. Typically, silica aerogels have been formed by supercritical drying, i.e. maintaining the silica gel at a pressure above the vapor pressure of the interstitial liquid until the critical temperature, i.e. the temperature at which the vapor phase cannot be condensed by increasing pressure, is reached and exceeded, and then reducing the pressure to release excess fluid in vapor form, leaving a high porosity silica aerogel.

Copending and commonly assigned U.S. application Ser. No. 08/267,687 filed Jun. 28, 1994 discloses that silica gels having high porosities can be produced from silica alcogels at subcritical temperatures if the liquid to be removed from the silica alcogel comprises from 80 to 100 percent by weight alcohol and the alcohol comprises at least 25 percent by weight isopropanol. Evaporation of isopropanol from silica alcogel at subcritical temperature, at ambient or higher pressure, yields a high porosity silica aerogel, typically at least 68 percent pore volume. Such a silica aerogel is disclosed to be useful as a thermal insulator.

The present invention recognizes that silica, particularly aerogel, particles can be effective in foam insulation with suitable surfactants, and relates to the use of particular surfactants, and blends of such surfactants with viscosity modifying agents, in combination with silica, particularly aerogel, particles to produce polyurethane foam with exceptional insulating capability (equaling the insulating capability of CFC blown foams) with alternate blowing agents, such as HCFC. Silica aerogel may be incorporated into polyurethane compositions using a wide variety of surfactants, such as those described in U.S. Pat. No. 4,751,251. However, the polysiloxane-polyoxyalkylene surfactants of the present invention are preferred for incorporating silica particles, particularly silica aerogel, into rigid polyurethane foams made with non-CFC blowing agents.

The preferred silica aerogel of the present invention is prepared in accordance with the teachings of U.S. application Ser. No. 08/267,687 filed Jun. 28, 1994, now abandoned. In a preferred embodiment, silica aerogel is reduced to fine particulate powder, preferably to a particle size less than 10 microns, more preferably in the range of 3 to 5 microns, i.e. preferably at least 90 weight percent of the particles are in that particle size range. The particle porosity of the silica aerogel powder is preferably in the range of 70 to 80 percent, more preferably about 80 percent. The bulk powder porosity is preferably at least about 90 percent, more preferably about 94 percent. The pore size is preferably in the range of 60 to 150 Angstroms, more preferably about 80 to 100 Angstroms. The surface area of the silica aerogel powder is preferably in the range of 450 to 650 square meters per gram, more preferably about 620 m²/g.

Siloxane surfactants of the present invention, and particularly blends of such surfactants with viscosity modifying agents, provide rapid emulsification of the polyurethane reactants, which is particularly important in very fast reacting formulations. Siloxane surfactants of the present invention, and particularly blends of such surfactants with viscosity modifying agents, decrease both the surface tension of liquid reaction mixtures, thus promoting thinner cell walls, and the interfacial tension between the liquid reaction mixture and silica particles, particularly aerogel, thus controlling the distribution of silica in the polyurethane. Siloxane surfactants of the present invention, particularly blended with a viscosity modifying agent, promote generation of a large number of small bubbles and control bubble size distribution within a narrow range. This reduction of average cell size reduces the radiative heat transfer ($K_r$) component of the total thermal conductivity, as does the presence of silica, particularly aerogel, particles. The preferred viscosity modifying agents of the present invention are compounds which comprise alkoxylate, carboxylate and carbonate moieties. Preferred carbonates, upon thermal decomposition, may generate $CO_2$ gas which can form additional bubbles in the polyurethane foam. By controlling flowability of the liquid reaction mixture, siloxane surfactants of the present invention, particularly blends of such surfactants with viscosity modifying agents, control drainage of the liquid reaction mixture as cells are formed promoting thinner cell walls with lower thermal conductance. Siloxane surfactants of the present invention also promote the formation of a self-healing foam, with high closed cell content, which improves thermal conductivity by retaining more of the non-CFC blowing agent in the foam.

Siloxane surfactants of the present invention are specially designed copolymers that are preferably prepared as follows. Hexamethyldisiloxane, octamethyl cyclotetrasiloxane, and a polymethylhydrogensiloxane are equilibrated to form a silicone fluid intermediate in accordance with the following reaction:

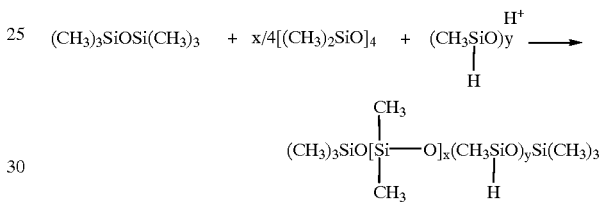

wherein y is generally in the range of 2 to 20. The value of x varies broadly, and may be preferably less than 10 for molded foam surfactants, about 10 to 60 for rigid foam surfactants and about 40 to 150 for flexible foam surfactants. A preferred acid catalyst in the equilibration reaction illustrated above is trifluoromethane sulfonic acid. The silicone fluid is a very stable, reproducible intermediate, which may be represented as $MD_xD'_yM$, where M is the trimethylsiloxy segment, D is the dimethylsiloxane segment and D' is the methylhydrogen-siloxane segment. The silicone fluid intermediate then undergoes hydrosilylation reaction with an unsaturated alkyl alkoxylate such as allyl polyether in accordance with the following reaction:

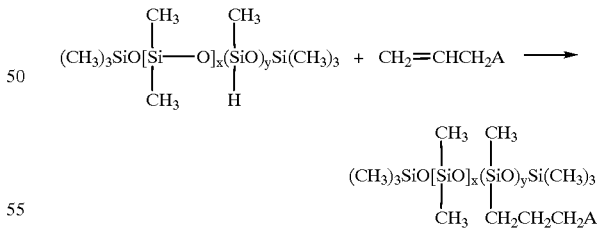

which may be represented as $MD_xD^*_yM$ wherein x may be from 1 to about 150 and is preferably 10 to 50, more preferably 10 to 42, especially 13 to 42; y may be 0, but is preferably from 1 to about 50, preferably 2 to 20, more preferably 5 to 20, especially 7 to 20, particularly 7 to 10; the ratio of x and y may be from 10:1 to 1:1 and is preferably between 2.4 and 6.8; and D* is the methylalkylalkoxysiloxane segment wherein the alkyl group of their segment preferably comprises 3 to 6 carbons and A is an alkoxylate of the general formula $O(C_2H_4O)_m(C_3H_6O)_nH$ wherein n may be from 0 to 20 and is preferably about 2 to 18, and m is about 5 to 200. A preferred allyl polyether has a random distribution of about 65 to 100, preferably 70 to 90, weight percent ethoxy groups and up to 35 percent, preferably 10 to 30 percent, propoxy groups, and a molecular weight of about 400 to 4000, preferably 400 to 1500, and more preferably 700 to 1300 for use in rigid polyurethane foams.

The surfactant may be represented by the general formula,

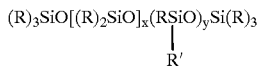

wherein R is methyl, x is a number of from 1 to about 150, preferably from 10 to 50, more preferably from 10 to 42, most preferably from 13 to 42, y is zero or a number of from 1 to about 50, preferably from 2 to 20, more preferably from 5 to 20, most preferably from 7 to 20 and 7 to 10, the ratio of x:y is from 10:1 to 1:1, preferably from 2.4 to 6.8, and R' is an alkyl alkoxylate. R' may be represented by the general formula,

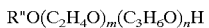

wherein R" is an alkylene group containing from 3 to 6 carbon atoms, m is a number of from 5 to 200, n is a number of from 0 to 20, preferably from 2 to 18. The molecular weight of R' is in the range of 400 to 4000, preferably 400 to 1500 and more preferably from 700 to 1300. The molecular weight of the surfactant is in the range of 9000 to 50,000, e.g., 9000 to 12,000.

For compatibility with particulate silica, particularly aerogels, the polysiloxane-polyoxyalkylene surfactants of the present invention are characterized by polysiloxane-polyoxyalkylene surfactant molecular weight, polysiloxane-polyoxyalkylene surfactant functionality, polyoxyalkylene pendant molecular weight and ethoxy/propoxy group ratio in the polyoxyalkylene. The polysiloxane-polyoxyalkylene surfactant molecular weight is preferably in the range of 9000 to 50,000, more preferably 9000 to 12,000 for use in rigid polyurethane foam compositions, most preferably about 10,000. Polysiloxane-polyoxyalkylene surfactant functionality is characterized by the proportion of polyoxyalkylene pendent groups to polysiloxane backbone, polyoxyalkylene molecular weight and proportion of ethoxy/propoxy groups, in the surfactant. Such factors determine surfactant activity in a polyurethane reaction mixture and also the incorporation and distribution of silica, particularly aerogel, in the polyurethane. Surfactant functionality is more hydrophilic with a higher proportion of polyoxyalkylene groups, lower pendent group molecular weight and a higher proportion of ethoxy groups. Surfactant functionality is more hydrophobic with a lower proportion of polyoxyalkylene groups, a higher molecular weight of the pendent group and lower ratio of ethoxy/propoxy groups.

The polyoxyalkylene pendent molecular weight is preferably in the range of 400 to 4000, more preferably in the range of 400 to 1500 for use in rigid foams, and most preferably in the range of 700 to 1300 for use in rigid polyurethane foams. The ethoxy/propoxy distribution is preferably 65 to 100, more preferably 70 to 90 weight percent ethoxy, and up to 35, preferably 10 to 30, weight percent propoxy, preferably randomly distributed.

The surfactants of the present invention typically have viscosities in the range of 900 to 1000 centipoises (0.9 to 1.0 Pascal-second), and are preferably blended with a viscosity modifying agent which does not interfere with the polyurethane reaction. The blend has a lower viscosity than the surfactant, which facilitates incorporation into the polyurethane reaction mixture, particularly when silica aerogel is added. Preferred agents are low viscosity liquid compounds organic which include methoxylate, ethoxylate, carboxylate and carbonate groups, such as propylene carbonate; 2-methoxyethyl ether; dipropylene glycol, methyl ether; triethylene glycol, dimethyl ether; triethylene glycol, monomethyl ether; tripropylene glycol, monomethyl ether; methyl-2,5-dihydro-2,5-methoxy-2-furancarboxylate; 1-methoxy-2-methylpropylene oxide; 2-methoxy ethyl acetoacetonate; diethylene glycol, monomethyl ether; 2-methoxy-1,3-dioxolane; methoxyacetone; methoxyacetaldehyde dimethyl acetal; methoxyacetaldehyde diethyl acetal; 2,5-dimethoxy tetrahydrofuran; 2,5-dimethoxy-3-tetrahydrofurano carboxaldehyde; 2,2-dimethoxy propane; 1,2-dimethoxy propane and dimethoxy methane. Particularly preferred compositions include propylene carbonate; 2-methoxy ethyl ether; dipropylene glycol, methyl ether; and commercially available alkyl and aryl polyethers such as the Tergitol® NP series from Union Carbide Corporation. The Tergitol® NP series of surfactants are ethoxylated nonyl phenol nonionic surfactants. Especially preferred viscosity modifying agents contain carbonate or carboxylate groups which generate carbon dioxide upon thermal decomposition. The carbon dioxide provides additional gaseous component in the foam. Propylene carbonate is particularly preferred as a viscosity modifying agent.

The ratio of surfactant to viscosity modifying agent is selected to reduce the viscosity preferably to less than about 750 centipoises (0.75 Pascal-second), more preferably less than about 500 centipoises (0.5 Pa-s), most preferably less than about 200 centipoises (0.2 Pa-s). Typically, a surfactant to viscosity modifying agent ratio of about 1:1 to 2.5:1 by weight is suitable as shown in FIG. 1. Higher amounts of viscosity modifying agent may be used if a very low viscosity blend is desired. For example, up to 90 weight percent propylene carbonate may be used effectively with the surfactants of the present invention.

The effectiveness of surfactant/agent blends in accordance with the present invention can be estimated by frothing. The surfactant and viscosity modifying agent are blended together in the desired ratio and added to a typical polyol reactant (e.g. Terate® 2541 from Cape Industries, Wilmington, N.C.) at a 2 weight percent level. A 50 milliliter sample of polyol containing the surfactant/agent blend is placed in a Waring blender and mixed for 5 minutes at a high shear rate to generate a froth. The time required for the froth to dissipate is a measure of the froth stability. For all of the blends tested, the froth stability is greater than 36 hours compared with about 90 minutes for the polyol with no additive, as shown in the following Table I.

TABLE I

| Viscosity Agent | Additive Surfactant/Agent (weight ratio) | Polyol/ Additive (weight ratio) | Froth Stability (hours) |
|---|---|---|---|
| 0 | 0 | | ~1.5 |
| 0 | 0 | | ~1.5 |
| PC | 70/30 | 96/2 | ~37 |
| PC | 70/30 | 100/2 | ~37 |
| PC | 60/40 | 100/2 | ~37 |
| Pc | 50/50 | 100/2 | ~37 |
| NP-8 | 70/30 | 100/2 | ~40 |
| NP-8 | 60/40 | 100/2 | ~40 |
| NP-8 | 50/50 | 100/2 | ~40 |

TABLE I-continued

| Viscosity Agent | Additive Surfactant/Agent (weight ratio) | Polyol/ Additive (weight ratio) | Froth Stability (hours) |
|---|---|---|---|
| NP-7 | 70/30 | 100/2 | ~40 |
| NP-7 | 60/40 | 100/2 | ~40 |
| NP-7 | 50/50 | 100/2 | ~40 |
| TMEE | 70/30 | 100/2 | ~40 |
| TMEE | 60/40 | 100/2 | ~40 |
| TMEE | 50/50 | 100/2 | >37 |
| DPG, ME | 70/30 | 100/2 | >37 |
| DPG, ME | 60/40 | 100/2 | >37 |
| DPG, ME | 50/50 | 100/2 | >37 |
| PC | 40/60 | 100/2 | >37 |
| PC | 30/70 | 100/2 | >37 |
| PC | 20/80 | 100/2 | >37 |

PC = propylene carbonate
NP-8 = Tergitol ™ NP-8
NP-7 = Tergitol ™ NP-7
TMEE = 2-methoxy ethyl ether
DPG, ME = dipropylene glycol, methyl ether For incorporation of silica particles, particularly silica aerogel particles, into a polyurethane foam, surfactants are combined with silica particles, particularly silica aerogel particles, based on their degree of hydrophilic versus hydrophobic functionality. If a hydrophobic aerogel is preferred for compatibility with the polyurethane reactants, a more hydrophobic surfactant composition is formulated. The ratio of surfactant to silica, particularly aerogel, in the polyurethane reaction mixture is preferably in the range of 2:1 to 10:1 by weight. The surfactant/silica, particularly aerogel, combination is preferably added to the polyol component of the polyurethane reaction mixture in the range of about 1 to 3 percent by weight of the polyol component, preferably about 2 percent for use in rigid foams. As little as 0.1 weight percent silica aerogel in the polyurethane foam may significantly improve its insulating capacity.

Silica aerogels as produced are characteristically hydrophilic, having the general formula

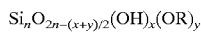

$$Si_nO_{2n-(x+y)/2}(OH)_x(OR)_y$$

wherein n is the number of silicon units and x and y are each from 1 to 3 but x plus y is less than 4 per silicon, and R is an alkyl group which forms a hydrolyzable alkoxy group. Such aerogels are compatible with hydrophilic surfactants in accordance with the present invention. In most instances, a more hydrophobic surfactant and aerogel may be preferred for compatibility with the polyurethane reactants. In such cases, the silica aerogel may be rendered more hydrophobic by treating the silica with a hydrophobicizing agent capable of reacting with silanol groups on the aerogel to render the aerogel hydrophobic. In commonly assigned U.S. application Ser. No. 08/267,687 filed Jun. 28, 1994, reaction of silica aerogel with trimethylchlorosilane is disclosed to produce hydrophobic aerogel by replacing hydrophilic hydroxyl groups with hydrophobic trimethylsilyl groups. This method has a disadvantage in producing corrosive hydrochloric acid byproduct. In accordance with the present invention, silica aerogel is preferably rendered hydrophobic by exposure to trimethylalkoxysilane and a basic catalyst, preferably ammonia. Treatment of silica aerogel with trimethylmethoxysilane or trimethylethoxysilane and ammonia vapor catalyst at a temperature sufficient to form the vapor of the trimethylalkoxysilane produces a hydrophobic silica aerogel suitable for use with hydrophobic surfactants in polyurethane foams to improve thermal insulating value. It is generally preferred to place the silica aerogel, in particle form, in an enclosure with about 10 weight percent of the trimethylalkoxysilane, based on the weight of aerogel, at a temperature just below the boiling point of the trimethylalkoxysilane for several hours.

For preparation of polyurethane foams containing the preferred surfactant/aerogel combinations of the present invention, conventional polyurethane compositions, including polyisocyanurates, are prepared by well-known techniques, such as disclosed in U.S. Pat. Nos. 4,751,251 and 5,308,881. The reactants are preferably maintained at ambient temperature, about 25° C. The polyurethane reactants are typically formulated as a two-component system. Generally, one component comprises polyol, water, blowing agent and catalyst, and the other comprises polyisocyanate. In accordance with the present invention, the surfactant, viscosity modifying agent and/or aerogel may be added as a separate component, or to either the polyol or polyisocyanate reactant component, and are preferably incorporated into the polyol component. The components are mixed, and the reaction mixture is transferred into a mold. The non-CFC blowing agent is typically 1,1-dichloro-1-fluoroethane (HCFC-141b). The reaction mixture is cured to produce a stable polyurethane foam insulating material.

Figure 3:
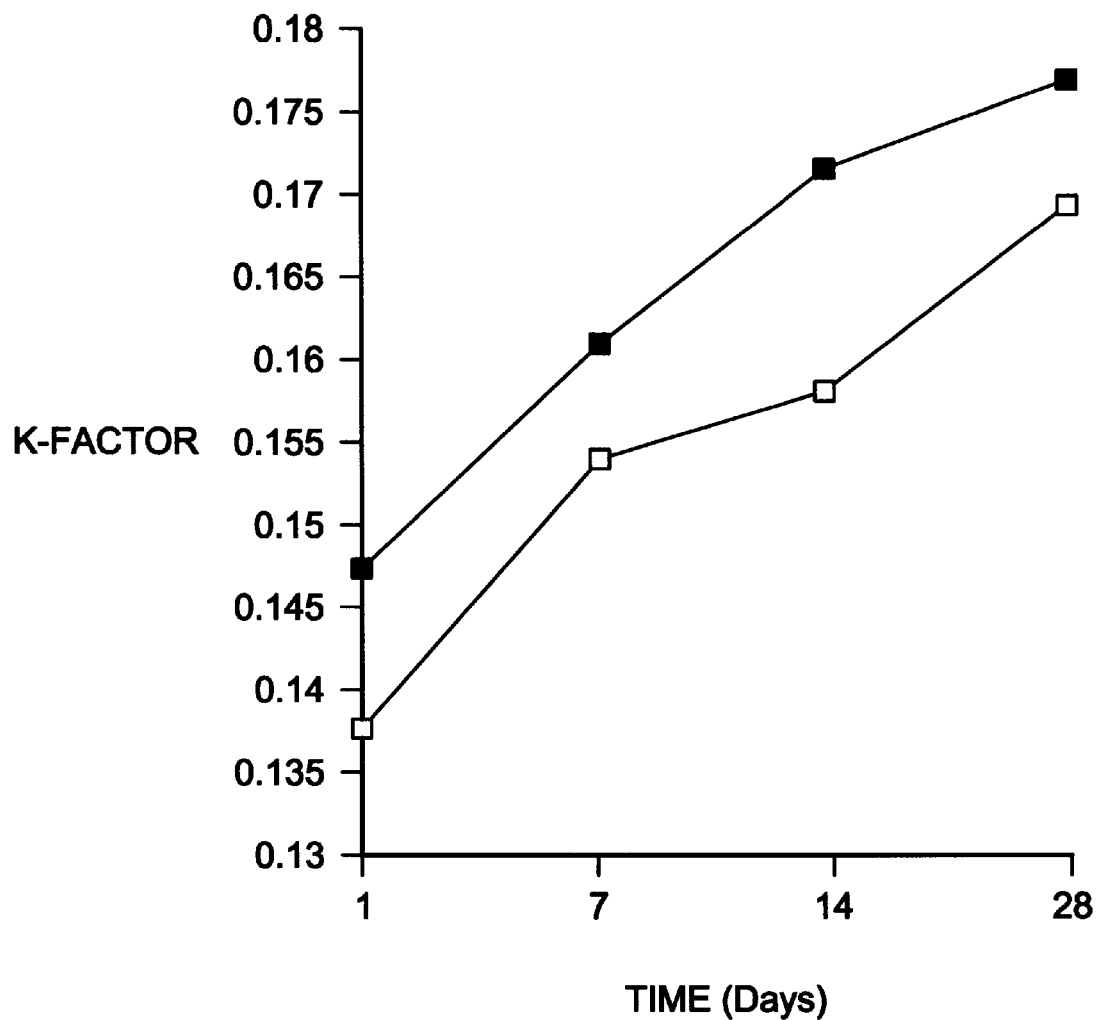
FIG. 3 compares the initial K-factor, in BTU-inch per square foot-hour-°F. (BTU-in/ft²hr°F.), and the K-factor upon aging of the foam for up to four weeks for a standard polyurethane insulating foam with the initial K-factor and aged K-factor for the same polyurethane foam composition containing a surfactant and silica aerogel additive of the present invention.

Polyurethane foams containing surfactant and silica, preferably aerogel, are particularly useful as insulating materials in appliance applications. Polyisocyanurate compositions containing surfactant and viscosity modifying agent are particularly useful for boardstock insulation in construction. Silica, particularly aerogel, may be included in boardstock formulations for optimum thermal performance, or the surfactant blend may be used alone for lower cost. In the examples to follow, the polyurethane foams were tested after 24 hours at room temperature. A polyurethane foam standard, i.e. the same polyurethane composition including a commercial surfactant but without the additive of the present invention, was prepared and tested with each sample, to eliminate variations in K-factor and other properties due to variations in humidity and other processing conditions. The closed cell content was measured using a pycnometer. The closed cell content of the polyurethane foam without the surfactant/silica additive of the present invention was generally in the range of 85 to 89 percent. The surfactant/silica aerogel additive of the present invention produced foams with the closed cell content typically within the range of 90 to 99 percent. Density of the samples with additives of the present invention was compared with the density of polyurethane standards without additives of the present invention. The thermal conductivity, K-factor (Btu-in/hr ft²°F.), was measured using an Anacom 88 instrument and compared for each set of samples to the thermal conductivity of a polyurethane standard without the additive of the present invention. The surfactant/silica aerogel additive of the present invention typically improves the initial K-factor by about 1 to 7 percent. Aged K-factor was measured after 1, 2 and 4 weeks, and was found to increase less than the K-factor of a polyurethane standard without the surfactant/silica aerogel additive of the present invention as shown in FIG. 3.

The surfactants, viscosity modifying agents and/or silica, particularly aerogels, of the present invention and their incorporation in polyurethane foams to improve thermal conductivity (K-factor) are illustrated by the following examples, which do not limit the scope of the invention as defined by the claims.

EXAMPLE I

Hexamethyldisiloxane, octamethyl cyclotetrasiloxane and polymethylhydrogensiloxane are equilabrated in the presence of an acid catalyst to form a silicone fluid precursor $MD_xD'_yM$ where M is methyl, D is the dimethylsiloxy moiety, and D' is the methylhydrogensiloxy moiety. At ambient temperature, 544 grams of hexamethyldisiloxane, 12,023 grams of octamethyl cyclotetrasiloxane and 1,534 grams of polymethylhydrogensiloxane were mixed with 9.13 grams of trifluoromethane sulfonic acid catalyst. The reaction mixture was heated to 70° C. with stirring under nitrogen and held at 70° C. for 6 hours. The reaction mixture was then neutralized with sodium bicarbonate, filtered, heated to 150° C., sparged with nitrogen and stripped of volatiles under vacuum to yield a clear product of nominal formula $MD_{40}D'_{7.8}M$.

The silicone fluid precursor is further reacted by hydrosilylation with an allyl polyether to form the surfactant $MD_xD^*_yM$ where M is methyl, D is the dimethylsiloxy moiety and D* is the previous methylhydrogensiloxy moiety D' wherein the hydrogen has now been replaced with a polyether pendant moiety. A reaction vessel was charged with 7136.1 grams of allyl polyether having a molecular weight of 800 and a ratio of ethoxy/propoxy groups of 75/25, 3506.4 grams of the above silicone fluid and 2 milliliters of 7.5 percent chloroplatinic acid solution catalyst. After purging with nitrogen, the vessel was sealed and heated to 80° C. with stirring for two hours. Then the reaction mixture was heated to 90° C. for another two hours. The reaction mixture changed from a white emulsion to a clear liquid.

EXAMPLE II

A siloxane surfactant also having a pendant polyether having a molecular weight of about 800 and an EO/PO ratio of 75/25 was prepared as in Example I. In this example, for the precursor and the surfactant, x is 13.8 and y is 5.1.

EXAMPLE III

A siloxane surfactant was prepared with an EO/PO ratio of 75/25 and a molecular weight of the polyether pendant of about 800 as in Example II, except that in this example, x is 14.8 and y is 6.1.

EXAMPLE IV

A siloxane surfactant was prepared as in the previous Examples, wherein the molecular weight of the polyether is about 800 and the EO/PO ratio is 75/25, but in this example x is 30 and y is 10.

EXAMPLE V

A siloxane surfactant was prepared as in the previous examples with an EO/PO ratio of 75/25 and a polyether pendant molecular weight of 800, but with x being 43.8 and y being 16.7.

EXAMPLE VI

A siloxane surfactant was prepared as in the previous examples except that the ratio of EO/PO was 80/20, and the average molecular weight of the polyether pendant was 1260, with x being 13.8 and y being 5.1.

EXAMPLE VII

A siloxane surfactant was prepared as in the previous example with an EO/PO ratio of 80/20 and a polyether pendant molecular weight of 1260, except that x was 38 and y was 7.1.

EXAMPLE VIII

A siloxane surfactant was prepared as in the previous examples with an EO/PO ratio of 80/20 and a polyether pendant molecular weight of 1260, except that x was 43.8 and y was 16.7.

EXAMPLE IX

A siloxane surfactant was prepared as in previous examples with an EO/PO ratio of 75/25 and a polyether pendant molecular weight of about 800, with x=41.5 and y=6.1.

EXAMPLE X

The surfactant of Example VII, which is relatively hydrophilic, was added to a relatively hydrophilic aerogel. Two parts by weight surfactant were combined with one part by weight aerogel particles. The aerogel was prepared by mixing a first solution of 100 grams of tetramethoxysilane and 50 grams of isopropanol with a second solution of 25 grams of water, 25 grams of isopropanol and 0.015 gram of aqueous ammonium hydroxide (29 percent). The reaction mixture formed an alcogel in 2 to 3 hours at 50° C. The alcogel was then dried at 50° C. to form a clear transparent aerogel having a porosity of 80 percent and a surface area of 584 square meters per gram, then micronized to a particle size less than 10 microns, nominally 3 microns.

EXAMPLE XI

The surfactant from Example IX, which is relatively hydrophobic, was combined with a relatively hydrophobic aerogel. Two parts by weight surfactant were combined with one part by weight of aerogel particles. The aerogel was prepared as in the previous example, then exposed to chlorotrimethylsilane vapor at 50° C. for 6 hours to render the aerogel hydrophobic. The porosity and surface area of the silica aerogel were not altered by the hydrophobicizing process.

EXAMPLE XII

Silica aerogel powder was prepared as in Example X. Then 100 grams of this silica aerogel powder was exposed at 70° C. for 4 hours to trimethylethoxysilane vapor and a trace amount of ammonia vapor. The trimethylethoxysilane was present at 12 percent by weight based on the weight of the aerogel. The resulting silica aerogel was hydrophobic in water, and hydrophobic in water containing up to 25 weight percent methanol. There was no significant change in the surface area, pore size or percent porosity of the silica aerogel. Similar results were obtained using trimethylmethoxysilane vapor.

EXAMPLE XIII

Silica aerogel powder prepared as in Example X was treated for 2 hours at 90° C. with water vapor containing a trace amount of ammonia vapor. All alkoxy groups were hydrolyzed to hydroxy groups. The hydrolyzed aerogel powder was hydrophobicized as in Example XII. The hydrophobicized aerogel powder was hydrophobic in water containing up to 35 percent methanol.

EXAMPLE XIV

A polyurethane foam was prepared from a reaction mixture comprising the surfactant and aerogel of Example X as follows. A reaction mixture of 100 parts by weight polyol (Voranol® 360, sucrose-based with an equivalent weight of 155.8), 1.5 parts water, 0.75 parts tetramethyl-1,2-ethanediamine (TMEDA), 0.75 parts bis(dimethylaminopropyl)methylamine (Polycat® 77 from Air Products), 2.0 parts surfactant, 1.0 part aerogel and 30 parts HCFC 141b blowing agent was stirred for 25 seconds at 3000 rpm. To the reaction mixture was added 129.6 parts by weight of poly(methylene)diisocyanate with an equivalent weight of 134. After stirring for an additional 12 seconds, the components were transferred into an aluminum mold, which had been preheated to 60° C. and treated with a silicone release agent (Chem Lease 77 from Chem-Lease, Inc.). The polyurethane was cured at 6° C. for 30 minutes. Then the foam was released from the mold and kept at room temperature for 24 hours prior to testing. The initial thermal conductivity K-factor was 0.137 BTU-in/ft²hr°F. (0.0197 watt/meter-Kelvin) with density of 1.79 pounds per cubic foot (28.6 kg/m³), compared with a K-factor of 0.147 BTU-in/ft²hr°F. (0.0212 W/m-K) and density of 1.81 pounds per cubic foot (28.9 kg/m³) for the polyurethane standard prepared for this example. The aged K-factors at 1, 2 and 4 weeks are shown in FIG. 3.

EXAMPLE XV

A polyurethane foam was prepared as in Example XIV except with the surfactant and aerogel of Example XI at 2 parts and one part by weight respectively. The initial K-factor was 0.134 BTU-in/ft²hr°F. (0.0193 W/m-K) and the density was 1.79 pounds per cubic foot (28.6 kg/m³), compared with the polyurethane standard for this example K-factor of 0.144 BTU-in/ft²hr°F. (0.0207 W/m-K) and density of 1.82 pounds per cubic foot (29.1 kg/m³). The closed cell content of this example was 93 percent compared with 89 percent for the polyurethane standard for this example.

EXAMPLE XVI

Figure 2:
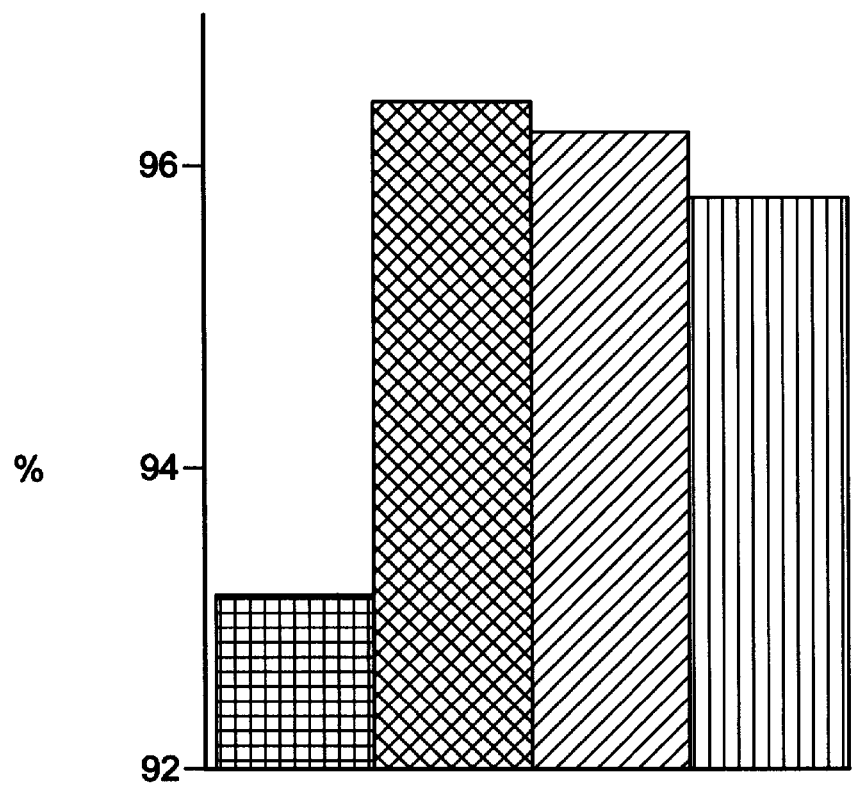
FIG. 2 compares the closed cell content of polyurethane foams made with surfactant of the present invention and various silica aerogels with the closed cell content of polyurethane foam made with a commercial surfactant.

Polyurethane foams were produced incorporating the surfactant of Example IX with three silica aerogels prepared as in Example XI. One silica aerogel sample is further reacted to be amino-terminated. A portion of the amino-terminated silica aerogel sample is then fired at 500° C. for 15 minutes to remove essentially all hydroxy, alkoxy and amino groups for the second sample. The third silica aerogel sample is further reacted to be alkyl-terminated. The closed cell content of the polyurethane foams containing silica aerogels and surfactant were all about 96 percent, compared with a closed cell content of about 93 percent for the same composition polyurethane foam produced using a commercial surfactant (L-6900 from OSI Specialties, Inc.) and no silica aerogel, as shown in FIG. 2.

While the present invention has been described above with reference to particular materials, various other polyurethane and polyisocyanurate compositions, surfactants, silica particles, such as fumed silica and other silica aerogel compositions, alternate blowing agents, and other processing conditions are contemplated in the scope of the present invention. The above examples are offered only as illustrative of the present invention, the scope of which is defined by the following claims.

What is claimed is:

1. A composition comprising a siloxane surfactant and a liquid low viscosity organic compound wherein said siloxane surfactant is represented by the general formula,

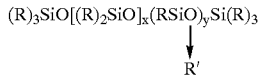

wherein R is methyl, x is a number of from 10 to 50, y is a number of from 2 to 20 and R' is an alkyl alkoxylate of the general formula, —R"O(C₂H₄O)ₘ(C₃H₆O)ₙH, wherein R" is an alkylene group containing from 3 to 6 carbon atoms, m is a number of from 5 to 200 and n is a number of from 2 to 18, wherein further, said liquid low viscosity organic compound is propylene carbonate, 2-methoxy ethyl ether, or dipropylene glycol methyl ether.

2. The composition of claim 1 wherein the viscosity of said composition is less than 500 centipoises, and the weight ratio of surfactant to low viscosity organic compound is from about 1:1 to 2.5:1.

3. The composition of claim 1 wherein x is a number of from 10 to 42, y is a number of from 5–20, and the liquid low viscosity organic compound is propylene carbonate, 2-methoxy ethyl ether, or dipropylene glycol methyl ether.

4. The composition of claim 3 wherein x is a number of from 13 to 42 and y is a number of from 7 to 20.

5. The composition of claim 3 wherein the viscosity of said composition is less than 500 centipoises.

6. The composition of claim 4 wherein the viscosity of said composition is less than 500 centipoises.

7. A composition comprising
(1) a siloxane surfactant represented by the general formula,

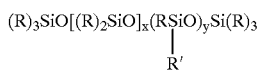

wherein R is methyl, x is a number of from 1 to about 150, y is selected from 0 and a number of from 1 to 50 and R' is an alkyl alkoxylate of the general formula, —R"O(C₂H₄O)ₘ(C₃H₆O)ₙH, wherein R" is an alkylene group containing from 3 to 6 carbon atoms, m is a number of from 5 to 200 and n is a number of from 2 to 18; and
(2) a liquid low viscosity organic compound selected from the group consisting of propylene carbonate, 2-methoxyethyl ether, dipropylene glycol methyl ether, triethylene glycol dimethyl ether, triethylene glycol monomethyl ether, tripropylene glycol monomethyl ether, methyl-2,5-dihydro-2,5-methoxy-2-furancarboxylate, 1-methoxy-2-methylpropylene oxide, 2-methoxy ethyl acetoacetonate, diethylene glycol monomethyl ether, 2-methoxy-1,3-dioxolane, methoxyacetone, methoxyacetaldehyde dimethyl acetal, methoxyacetaldehyde diethyl acetal, 2,5-dimethoxy tetrahydrofuran, 2,5-dimethoxy-3-tetrahydrofurano carboxaldehyde, 2,2-dimethoxy propane, 1,2-dimethoxy propane and dimethoxy methane, the viscosity of said composition being less than about 750 centipoises.

* * * * *